(12) United States Patent
Taxak et al.

(10) Patent No.: US 11,794,445 B2
(45) Date of Patent: Oct. 24, 2023

(54) MULTI-LAYERED FIBROUS STRUCTURES FOR MODERATE TEMPERATURE

(71) Applicant: ZEPHYROS, INC., Romeo, MI (US)

(72) Inventors: Manish Taxak, Maharashtra (IN); Sivansankaran Kumaraguru, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 17/777,683

(22) PCT Filed: Nov. 16, 2020

(86) PCT No.: PCT/US2020/060671
§ 371 (c)(1),
(2) Date: May 18, 2022

(87) PCT Pub. No.: WO2021/101825
PCT Pub. Date: May 27, 2021

(65) Prior Publication Data
US 2023/0021392 A1    Jan. 26, 2023

(30) Foreign Application Priority Data

Nov. 22, 2019  (IN) .............................. 201931047857

(51) Int. Cl.
*B32B 5/26* (2006.01)
*B32B 5/06* (2006.01)
*B32B 5/02* (2006.01)

(52) U.S. Cl.
CPC .............. *B32B 5/266* (2021.05); *B32B 5/022* (2013.01); *B32B 5/073* (2021.05);
(Continued)

(58) Field of Classification Search
None
See application file for complete search history.

(56) References Cited

U.S. PATENT DOCUMENTS

| 6,534,145 B1 * | 3/2003 | Boyles | B60N 3/048 |
| | | | 428/92 |
| 2004/0180177 A1 * | 9/2004 | Ray | D04H 1/76 |
| | | | 428/95 |

(Continued)

FOREIGN PATENT DOCUMENTS

| CA | 2370110 A1 | 1/2001 |
| CN | 103443342 A | 12/2013 |

(Continued)

OTHER PUBLICATIONS

International Search Report and Written Opinion, Application No. PCT/US2020/060671, dated Mar. 24, 2021.

(Continued)

*Primary Examiner* — Alexander S Thomas
(74) *Attorney, Agent, or Firm* — The Dobrusin Law Firm, P.C.

(57) ABSTRACT

An article comprising: (a) one or more nonwoven material layers comprising a lofted fibrous material; and (b) one or more molded material layers having a fibrous matrix, wherein the article is configured to at least partially thermally insulate an item or compartment and the article absorbs external heat or cold to substantially prevent amplitude of temperature fluctuation of the item or within the compartment.

20 Claims, 2 Drawing Sheets

(52) U.S. Cl.
CPC ..... *B32B 2255/02* (2013.01); *B32B 2307/304* (2013.01); *B32B 2307/416* (2013.01); *B32B 2307/514* (2013.01); *B32B 2307/732* (2013.01); *B32B 2307/738* (2013.01)

(56) References Cited

U.S. PATENT DOCUMENTS

| | | | |
|---|---|---|---|
| 2005/0153613 A1 | 7/2005 | Bingenheimer | |
| 2006/0228971 A1* | 10/2006 | Bridges | D04H 1/492 442/382 |
| 2013/0112071 A1 | 5/2013 | Bhatnagar | |
| 2013/0291990 A1 | 11/2013 | Nagarajan | |
| 2014/0030491 A1 | 1/2014 | Sakai | |
| 2014/0050886 A1* | 2/2014 | Burgin | B32B 5/26 442/374 |
| 2018/0005620 A1* | 1/2018 | Bush | B32B 3/266 |
| 2019/0269188 A1 | 9/2019 | Ridley | |

FOREIGN PATENT DOCUMENTS

| | | |
|---|---|---|
| CN | 103517798 A | 1/2014 |
| EP | 2503040 A1 | 9/2012 |
| JP | H06278249 A | 10/1994 |
| JP | H07237284 A | 9/1995 |
| WO | 2019018508 A1 | 1/2019 |

OTHER PUBLICATIONS

Chinese First Office Action dated Jan. 20, 2023, for Application No. 202080080440.6.
Chinese Search Report dated Jan. 17, 2023, for 202080080440.6.

\* cited by examiner

MULTI-LAYERED FIBROUS STRUCTURES FOR MODERATE TEMPERATURE

FIELD

The present teachings generally relate to a fibrous material, and more specifically, to a fibrous material capable of being used in applications requiring low flammability, thermal insulation, thermal absorption, or a combination thereof.

BACKGROUND OF THE INVENTION

Various industries often require certain material properties to meet industry standards. These material properties may include structural properties (e.g., flexibility, physical strength, or both), cushioning, insulation, sound absorption, or a combination thereof. Often, industries establish specific standards to ensure the safety of people, vehicles, products, or a combination thereof. These industries include the automotive industry, the aircraft industry, the construction industry, and the marine industry. For example, the National Highway Traffic Safety Administration often requires vehicles to meet certain heat resistance minimums, flammability standards, vehicle crash-testing performance standards, or a combination thereof. Due to more demanding standards throughout the industries, the materials being utilized need to be robust, adaptable, tunable, or a combination thereof, yet not increase the cost imposed on manufacturers, customers, consumers, or a combination thereof.

The automotive industry specifically may often require materials that provide thermal insulation, sound absorption, other structural properties, or a combination thereof. Depending on where the materials are being implemented within a vehicle, the material properties may often need to meet extremely demanding requirements. For example, materials being utilized within or near an engine bay may often need heightened thermal insulation, proper air circulation, heightened flame retardance, or a combination thereof to withstand the heat output from the engine bay. Typical materials used to meet these requirements include open cell polyurethane foams, elastomeric foams, or both. However, these materials may only survive up to temperatures between about 120° C. to about 150° C. Other materials, such as fiberglass, melamine foam, or both are used when temperatures exceed 150° C. These materials may often come at an increased cost, may increase difficulty in handling during manufacturing, or both. Additionally, these materials may also pose health and safety issues, may not provide sufficient material robustness, may result in performance issues, or a combination thereof. Additionally, the alternative materials utilized over conventional foams may still not meet the temperature resistance required. The alternative materials may degrade quite severely at heightened temperatures of about 180° C. to about 200° C., which causes issues with delamination, acoustic and/or thermal insulation performance, aesthetics, or a combination thereof.

Furthermore, materials may also be brittle, which creates increased dust and may make a typical manufacturing process unsafe. Along with the brittleness, the alternative materials frequently used over conventional foams may often lack the flexibility to tune the materials for a given application. As a result, the materials are often limited to specific applications, shapes, dimensions, physical properties, or a combination thereof.

Therefore, there remains a need for a material having improved thermal insulation to maintain a temperature of a desired area. What is needed is a fibrous material that absorbs excessive heat from an area. There remains a need for a material that can effectively transfer absorbed heat from a desired area. What is needed is a fibrous material having improved air circulation for excessive heat absorbed by the fibrous material. Additionally, there remains a need for a material that can be adapted for a variety of applications across one or more industries. What is needed is a material that is flexible, moldable, or both to form to one or more desired applications.

SUMMARY

The present teachings meet one or more of the present needs by providing an article comprising: (a) one or more nonwoven material layers comprising a lofted fibrous material; and (b) one or more molded material layers having a fibrous matrix, wherein the article is configured to at least partially thermally insulate an item or compartment and the article absorbs external heat or cold to substantially prevent amplitude of temperature fluctuation of the item or within the compartment.

The present teachings meet one or more of the present needs by providing an article, wherein: the item to be insulated is a cabin of a vehicle; the external heat radiates from an engine bay; the article is temperature resistant and temperature absorbent at a temperature range of about −30° C. to about 350°; the fibrous matrix includes fibers selected from polyester (PET), polyacrylonitrile (PAN), oxidized polyacrylonitrile (Ox-PAN, OPAN, or PANOX), aramid, olefin, polyamide, imide, polyetherketone (PEK), polyetheretherketone (PEEK), poly(ethylene succinate) (PES), mineral, ceramic, natural, another inorganic fiber, or another polymeric fiber; the lofted fibrous material is selected from polyester (PET), polyacrylonitrile (PAN), oxidized polyacrylonitrile (Ox-PAN, OPAN, or PANOX), aramid, olefin, polyamide, imide, polyetherketone (PEK), polyetheretherketone (PEEK), poly(ethylene succinate) (PES), mineral, ceramic, natural, another inorganic fiber, or another polymeric fiber; the article further comprises one or more IR reflective layers disposed on one or more exterior surfaces of the article; the one or more molded material layers are thermoformed; one or more air pockets are located between the one or more nonwoven material layers and the one or more molded material layers; the one or more nonwoven materials and the one or more molded materials are secured to one another via stitching to form the article; the article is flexible, formable, or both; the lofted fibrous material is generally vertically or near-vertically oriented; the fibrous matrix includes fibers that are generally vertically or near-vertically oriented; the lofted fibrous material and the fibrous matrix are made from generally the same fibers; the lofted fibrous material and the fibrous matrix are made from different fibers; at least one of the one or more molded material layers is a fiber cement layer; the article includes at least two abutting nonwoven material layers sandwiched between at least two molded material layers; the article is non-toxic; the article is burn resistant; the one or more IR reflective layers are aluminum laminated glass cloth, aluminum foil, or both; the one or more nonwoven material layers and the one or more molded material layers each have a thickness of no greater than 50 mm; the fibers of the lofted fibrous material have a weight of about 400 to about 800 GSM; the fibers of the fibrous matrix have a weight of about 200 to about 400 GSM; or a combination thereof.

The present teachings meet one or more of the present needs by providing: a material having improved thermal insulation to maintain a temperature of a desired area; a fibrous material that absorbs excessive heat from an area; a material that can effectively transfer absorbed heat from a desired area; a fibrous material having improved air circulation for excessive heat absorbed by the fibrous material; a material that can be adapted for a variety of applications across one or more industries; a material that is flexible, moldable, or both to form to one or more desired application; or a combination thereof.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Insulation materials, structural materials, acoustic absorption materials, or a combination thereof may have a wide range of applications, such as in automotive applications, aviation applications, commercial vehicle engine compartments, in-cab areas, construction equipment, agricultural applications, flooring, floormate underlayments, and heating, ventilation and air conditioning (HVAC) applications. These materials may also be used for machinery and equipment insulation, motor vehicle insulation, domestic appliance insulation, and commercial wall and ceiling panel insulation. For example, insulation materials may be used in an engine cavity or along a floor of a vehicle cabin. These materials may also provide other benefits, such as sound absorption, compression resiliency, stiffness, desired structural properties, protection (e.g., to an item around which the insulation material is located), or a combination thereof. These materials may also serve as a sound attenuation material in an aircraft or a vehicle, attenuating sound originating from outside a cabin and propagating toward the inside of the cabin.

The present teachings envision the use of these insulation materials, structural materials, acoustic absorption materials, or a combination thereof to form the present article. The article may function to provide insulation to one or more items, one or more compartments, or both. For example, the article may be positioned within an engine compartment and/or underneath a floor of a vehicle cabin to insulate a vehicle cabin from heat generated within the engine compartment. The article may function to provide structural reinforcement to one or more items. The article may function to absorb sound. While an automotive vehicle compartment is specifically referenced herein, it is to be understood that the article disclosed herein can be used to provide insulation to any desired items or any desired compartments, and the teachings herein are not limited to use only within or adjacent to an engine compartment. For example, other applications may include, but are not limited to, in-cabin insulation, heat shielding for transportation and off-highway vehicles, thermoacoustic insulation in generator sets, airs compressors, HVAC units, other stationary or mobile mechanical units where heat or noise is generated, or a combination thereof. The article may be formed into the shape of a box or other enclosure. The article may be moldable or otherwise shaped, thereby allowing for mechanical features to be in-situ molded or for allowing fastening or assembly mechanisms to be included. The article may be pliable, bendable, flexible, or a combination thereof. As such, it is contemplated that the article may be bent so that the article may be secured around an item to be insulated. The article may include one or more layers. It is contemplated that the article includes a plurality of layers to improve insulation, physical properties, or both (e.g., higher density materials, porous limp sheets, fabrics, scrims, meshes, etc.). The article may be configured to absorb a temperature fluctuation caused by one or more external heat sources to maintain a desired temperature of an item, within a compartment, or both. The article may be configured to operate within any desired temperature range. For example, the article may operate at a temperature of about −50° C. or more, about 0° C. or more, or about 100° C. or more. The article may operate at a temperature of about 1,000° C. or less, about 750° C. or less, or about 500° C. or less. For example, the article may operate at a temperature of about −30° C. to about 350° C. The article may maintain a temperature of a compartment to within +/−5° C. or less, +/−3° C. or less, or even +/−1° C. or less of ambient.

The present teachings envision the use of an article that is fire retardant, smoke retardant, safe and/or easier to handle (e.g., without the need for certain items of protective equipment), has a low toxicity (e.g., as compared to pure glass fibers and phenolic resonated shoddy), or any combination thereof. The article may be used for acoustic and/or thermal insulation, for providing compression resistance, for providing a material that reduces or eliminates the possibility of mold or mildew therein, or a combination thereof. The article may provide long-term structure stability for long-term acoustic and/or thermal performance. The article may provide long-term resistance to humid environments or may be able to withstand temperature and humidity variations and fluctuations.

The article may include one or more nonwoven layers that function to provide insulation, acoustic absorption, structural support and/or protection to one or more items, or a combination thereof. The nonwoven layers may have a high loft (or thickness) at least in part due to the orientation of the fibers, the method of forming the layers, or both. For example, the fibers within the nonwoven layers may be cross-lapped, vertically lapped, or both. The vertically lapped fibers may have a higher loft when compared to conventional fiber arrangements due to the fibers being oriented generally transverse to the longitudinal axis of the nonwoven layers. The nonwoven layers may exhibit good resilience and/or compression resistance. The nonwoven layers may be able to be compressed to fit within a cavity or wall structure, such as within an engine compartment. The nonwoven layers due to factors such as, but not limited to, unique fibers, surfaces, physical modifications to the three-dimensional structure (e.g., via processing), orientation of fibers, or a combination thereof, may exhibit good thermal insulation capabilities versus traditional insulators.

It is contemplated that the nonwoven layers may be adjusted based on the desired properties for a given application. The nonwoven layers may be tuned to provide a desired weight, thickness, compression resistance, other physical attribute, or a combination thereof. For example, the nonwoven layers may have a weight of about 200 grams per square meter (GSM) or more, about 500 GSM or more, or about 1,500 GSM or more. The nonwoven layers may have a weight of about 4,000 GSM or less, about 3,000 GSM or less, or about 2,000 GSM or less. The nonwoven layers may be tuned to provide a desired thermal conductivity. The nonwoven layer may be thermoformable so that the nonwoven layers may be molded or otherwise shaped to fit within a channel or hollow cavity of the structure to be insulated and/or reinforced. The thermoforming may be possible due to one or more binding agents present in the nonwoven layers.

The nonwoven layers may be substantially uniform or may vary depending on the application. For example, each nonwoven layer may incorporate the same type of fibers, may have a substantially similar loft, may have a substantially similar fiber orientation (e.g., each nonwoven layer is vertically lapped), may have a substantially similar weight, or a combination thereof. Alternatively, or additionally, the nonwoven layers may vary in one or more of the aforementioned properties to even further tune one or more characteristics of the article. Therefore, it should be clear from the present teachings that the article may be highly customizable to meet the demands of any given application.

The fibers that make up the nonwoven layers may have an average linear mass density of about 0.5 denier or greater, about 1 denier or greater, or about 5 denier or greater. The material fibers that make up the nonwoven layers may have an average linear mass density of about 25 denier or less, about 20 denier or less, or about 15 denier or less. Fibers may be chosen based on considerations such as cost, resiliency, desired thermal conductivity, or the like. For example, a coarser blend of fibers (e.g., a blend of fibers having an average denier of about 12 denier) may help provide resiliency to the nonwoven layers. A finer blend may be used, for example, if thermal conductivity is desired to be further controlled. The fibers may have a staple length of about 1.5 millimeters or greater, or even up to about 70 millimeters or greater (e.g., for carded fibrous webs). For example, the length of the fibers may be between about 30 millimeters and about 65 millimeters. The fibers may have an average or common length of about 50 to 60 millimeters staple length, or any length typical of those used in fiber carding processes. Short fibers may be used (e.g., alone or in combination with other fibers) in any nonwoven processes, such as the formation of air laid fibrous webs. For example, some or all of the fibers may be a powder-like consistency (e.g., with a fiber length of about 2 millimeters to about 3 millimeters, or even smaller, such as about 200 microns or greater or about 500 microns or greater). Fibers of differing lengths may be combined to provide desired insulation and/or acoustic properties. The fiber length may vary depending on the application; the insulation properties desired; the acoustic properties desired; the type, dimensions and/or properties of the nonwoven layers (e.g., density, porosity, desired air flow resistance, thickness, size, shape, and the like of the nonwoven layers and/or any other layers of the article); or any combination thereof. The addition of shorter fibers, alone or in combination with longer fibers, may provide for more effective packing of the fibers, which may allow pore size to be more readily controlled in order to achieve desirable characteristics (e.g., acoustic and/or insulation characteristics).

The fibers forming the nonwoven layers may be natural or synthetic fibers. Suitable natural fibers may include cotton, jute, wool, cellulose, glass, and ceramic fibers. Suitable synthetic fibers may include polyester, polypropylene, polyethylene, nylon, aramid, imide, acrylate fibers, or a combination thereof. The fibrous layers may comprise polyester fibers, such as polyethylene terephthalate (PET), and co-polyester/polyester (CoPET/PET) adhesive bi-component fibers. The fibers may include polyacrylonitrile (PAN), oxidized polyacrylonitrile (Ox-PAN, OPAN, or PANOX), olefin, polyamide, polyetherketone (PEK), polyetheretherketone (PEEK), poly(ethylene succinate), polyether sulfonate (PES), or other polymeric fibers. The fibers may include mineral or ceramic fibers. The fibers may be formed of any material that is capable of being carded and lapped into a three-dimensional structure. The fibers may be 100% virgin fibers or may contain fibers regenerated from post-consumer waste (for example, up to about 90% fibers regenerated from postconsumer waste or even up to 100% fibers regenerated from postconsumer waste). The fibers may have or may provide improved thermal insulation properties. The fibers may have relatively low thermal conductivity. The fibers may be flame-retardant, heat resistant, or both. The fibers may be water repellant, water resistant, or both. The fibers may be antimicrobial, antifungal, or both. The fibers may have geometries that are non-circular or non-cylindrical to alter convective flows around the fiber to reduce convective heat transfer effects within the three-dimensional structure. The nonwoven layers may include or contain engineered aerogel structures to impart additional thermal insulating benefits.

The article may also include one or more molded layers that may function to further improve insulation, acoustic absorption, structural support and/or protection to one or more items, or a combination thereof. The molded layers may provide structure or rigidity to the article. The molded layers may be molded into any desired shape to meet a given application. The molding may be possible due to one or more binding agents present in the molded layers. The binding agents may facilitate the molded layers retaining a desired shape. The molded layers may form a shape of the overall article. For example, the molded layers may be molded to have a desired contour, and the nonwoven layers may follow a contour of the molded layers when secured to the molded layers. The molded layers may be thermoformable to allow for the molded layers to meet any desired dimensions. The molded layers may have one or more contours, one or more arcuate portions, one or more linear segments, one or more steps, one or more bumps, one or more undulations, one or more convex portions, one or more concave portions, one or more divots, or a combination thereof. The molded layers may retain a desired shape after thermoforming. The desired shape may mate with a shape of one or more items, one or more compartments, or both. For example, the molded layers may be molded to follow a contour within an engine compartment or a vehicle.

The molded layers may exhibit similar properties to the nonwoven layers. The molded layers and the nonwoven layers may both provide insulation, provide structural support, provide acoustic absorption, or a combination thereof. Alternatively, the molded layers may exhibit properties dissimilar to the nonwoven layers. The molded layers may provide structural integrity to the article while the nonwoven layers may provide compressibility to the article. For example, the molded layers may be more rigid than the nonwoven layers to prevent excessive bending of the article while the nonwoven layers are a high lofted material that may compress upon an application of force. Therefore, it is contemplated that the molded layers may be adjusted based on the properties for a given application in conjunction with, or in lieu of, adjusting the nonwoven layers. For example, the molded layers may be tuned to provide a desired weight, thickness, compression resistance, other physical attribute, or a combination thereof. For example, the nonwoven layers may have a weight of about 200 GSM or more, about 500 GSM or more, or about 1,500 GSM or more. The nonwoven layers may have a weight of about 4,000 GSM or less, about 3,000 GSM or less, or about 2,000 GSM or less.

The molded layers may be made up of a fiber matrix. The fiber matrix may be of a relatively low weight yet still exhibit good resiliency and thickness retention. The fiber matrix, due to factors such as, but not limited to, unique fibers, facings, physical modifications to the three-dimensional structure (e.g., via processing), orientation of fibers, or a combination thereof, may exhibit good thermal insulation capabilities or thermal conductivity (e.g., lower) versus traditional insulation materials. The fiber matrix, and thus the molded layers, may retard fire and/or smoke. The fiber matrix, or parts thereof, may be capable of withstanding high temperatures without degradation (e.g., temperatures up to about 1150° C.). The fiber matrix may provide structural properties or may provide physical strength to the molded layers. The fiber matrix may provide insulative properties. The fiber matrix may function to provide high temperature resistance, acoustic absorption, structural support and/or protection to the area of the article within which the molded layers are located.

The fiber matrix may be made up of fibers. The fibers that make up the molded layers may be the same or dissimilar to the fibers that make up the nonwoven layers. For example, both the nonwoven layers and the molded layers may include the same organic and/or inorganic fibers, the manufacturing process, additives within the layers, orientation of the fibers within the layers, dimensions of the individual fibers, or a combination thereof may dictate resultant properties of each other. As such, it is contemplated that the nonwoven layers and the molded layers may comprise substantially similar fibers, yet the nonwoven layers and the molded layers may exhibit substantially unique structural properties. For example, the nonwoven layers may be a high lofted material to promote air circulation throughout the article while the molded layers may be compressed to have a substantially more rigid structure when compared to the nonwoven layers.

At least some of the fibers forming the fiber matrix of the molded layers may be of an inorganic material. The inorganic material may be any material capable of withstanding temperatures of about 250° C. or greater, about 500° C. or greater, about 750° C. or greater, or about 1000° C. or greater. The inorganic material may be a material capable of withstanding temperatures up to about 1200° C. (e.g., up to about 1150° C.). The fibers of the fiber matrix may include a combination of fibers having different melting points. For example, fibers having a melting temperature of about 900° C. may be combined with fibers having a higher melting temperature, such as about 1150° C. When these fibers are heated above the melting temperature of the lower melt temperature fibers (e.g., exceeding 900° C.), the lower melt temperature fibers may melt and bind to the higher temperature fibers. The inorganic fibers may have a limiting oxygen index (LOI) via ASTM D2836 or ISO 4589-2 for example that is indicative of low flame or smoke. The LOI of the inorganic fibers may be higher than the LOI of standard binder fibers. The inorganic fibers may be present in the fiber matrix in an amount of about 60 percent by weight or greater, about 70 percent by weight or greater, about 80 percent by weight or greater, or about 90 percent by weight or greater. The inorganic fibers may be present in the fiber matrix in an amount of about 100 percent by weight or less. The inorganic fibers may be selected based on a desired stiffness. The inorganic fibers may be crimped or non-crimped. Non-crimped organic fibers may be used when a fiber with a larger bending modulus (or higher stiffness) is desired. The inorganic fibers may be ceramic fibers, silica-based fibers, glass fibers, mineral-based fibers, or a combination thereof. Ceramic and/or silica-based fibers may be formed from polysilicic acid (e.g., Sialoxol or Sialoxid), or derivatives of such. For example, the inorganic fibers may be based on an amorphous aluminum oxide containing polysilicic acid. The fibers may include about 99% or less, about 95% or less, or about 92% or less $SiO_2$. The remainder may include —OH (hydroxyl or hydroxy) and/or aluminum oxide groups. Siloxane, silane, and/or silanol may be added or reacted into the fiber matrix to impart additional functionality. These modifiers may include carbon-containing components.

The inorganic fibers may provide excellent insulation characteristics. The inorganic fibers may be a non-combustible textile fiber, such as BELCOTEX® (e.g., BELCOTEX® 90, BELCOTEX® 110, or BELCOTEX® 225), available from BELCHEM GmbH, Kesselsdorf, Germany.

The fiber matrix may comprise one or more structural fibers. The structural fibers may be a fiber cement material. It is contemplated that the structural fibers may be included to further improve flame retardance of the article. The structural fibers may have any desired specifications based on a given application. For example, the structural fibers may have a weight of about 200 GSM or more, about 500 GSM or more, or about 1000 GSM or more. The structural fibers may have a weight of about 2,000 GSM or less, about 1,500 GSM or less, or about 1,250 GSM or less. The molded layers may include the structural fibers disposed within cement to reinforce the cement and form the molded layer. As such, the structural fibers may reinforce a cement layer to provide further flame retardance, structural integrity (e.g., impact resistance), or both to the article.

The molded layers may be substantially uniform or may vary depending on the application. For example, each molded layer may incorporate the same type of fibers, may have a substantially similar thickness, may have a substantially similar fiber orientation (e.g., each molded layer includes a similar fiber matrix orientation), may have a substantially similar weight, or a combination thereof. Alternatively, or additionally, the molded layers may vary in one or more of the aforementioned properties to even further tune one or more characteristics of the article.

The nonwoven layers and the molded layers may be secured to one another to form the article. The layers may be attached to each other by one or more lamination processes, one or more adhesives, heat sealing, sonic or vibration welding, pressure welding, another mechanical connection, or a combination thereof. It is contemplated that the layers may be secured to one another mechanically using stitching. The stitching may function to secure or interconnect all or some of the layers of the article together. The stitching that forms the seams may interconnect the layers to form an overall shape of the article. The stitching may extend through an entire thickness of the article or only a portion of the article. The stitching may be any desired threading material to meet the demands of an application. For example, the stitching may be flame retardant, heat resistant, thermally insulating, or a combination thereof. The stitching may be disposed anywhere along the layers of the article in any desired fashion. The stitching may extend through preformed holes or more be pierced through the layers via a needle. The stitching may seal a periphery of the article or may create one or more openings. The stitching may compressibly secure the nonwoven layers and the molded layers together. As such, the layers may follow a contour of one another to form the overall contour of the article.

The stitching may form one or more panels of the article. The panels may make up the overall article dimensions. The panels may interconnect. The panels may be a unitary piece and the panels may be distinguished from one another via the stitching. The panels may provide additional structural rigidity to the article, compressibility to the article, or both. The panels may be any desired size and/or shape. The article may include a single panel or a plurality of panels. For example, the article may be stitched along a periphery to secure each layer to each other so that the article may form a single panel.

The panels may include one or more pockets. The pockets may function to provide further loft to the article. The pockets may function to provide improved air circulation throughout the article to maintain a temperature within a compartment being insulated, maintain a temperature of an item being insulated, or both. The pockets may be a hollow air pocket. Alternatively, the pockets may be filled with one or more additional insulation or structural materials. For example, the pockets may be filled with loose particles and/or fibers for further insulation yet the loose particles and/or fibers promotes air circulation. The pockets may be any size and/or shape. The pockets may be formed between two abutting nonwoven layers, between two abutting molded layers, between an abutting molded layer and a nonwoven layer, or a combination thereof. The pockets may be compressible. The pockets may form a structurally rigid cavity. A shape of the pockets may be dictated by a contour of the nonwoven layers, molded layers, or both that mate to form the pockets. The pockets may be formed by stitching around a given area of the one or more adjacent layers. The pockets may be positioned between any layers of the article.

One or more exterior surfaces of the article may include a reflective layer. The reflective layer may function to reflect heat. The reflective layer may be formed by a coating applied to one or more surfaces of the article so that the coating may have high infrared reflectance or low emissivity. The reflective layer may be an extension of the nonwoven layers, the molded layers, or both. For example, fibers along an outer surface of the molded layers may form the reflective layer. At least some of the surfaces of the nonwoven layers, molded layers, or both may be metallized to provide infrared (IR) radiant heat reflection to form the reflective layer. To provide heat reflective properties to protect the article, one or more layers may be metalized. For example, fibers of the molded layers may be aluminized. The fibers themselves may be infrared reflective (e.g., so that an additional metallization or aluminization step may not be necessary). Metallization or aluminization processes can be performed by depositing metal atoms onto the fibers of the layers. As an example, aluminization may be established by applying a layer of aluminum atoms to the layers.

Alternatively, or additionally, the reflective layer may be a separate layer disposed on top of one or more exterior surfaces of the article. The reflective layer may be adhered to an exterior surface of the article. The reflective layer may be fastened to the article (e.g., stitched to the article along with the interconnected layers). The reflective layer may be a foil, film, or both. The reflective layer may be metallic. For example, the reflective layer may be an aluminum foil, an aluminum laminated glass cloth, or both.

Any layers of the article may have a desired thickness that provides the desired properties of the articles. The layers may have a thickness of about 2 mm or more, about 5 mm or more, or about 20 mm or more. The layers may have a thickness of about 100 mm or less, about 75 mm or less, or about 55 mm or less. Each layer (e.g., the nonwoven layers, the molded layers, or both) may have a similar thickness or may vary in thickness.

As described herein, the nonwoven layers, the molded layers, or both may be thermoformable. The thermoforming may result from heating and then forming the layers into a specifically shaped thermoformed product. The layers may have a varying thickness (and therefore a varied or non-planar profile) along a length of the layers. Areas of lesser thickness may be adapted to provide controlled flexibility to the layers, such as to provide an area that is folded (to fit within a hollow cavity to be insulated) or otherwise shaped, such as to form a corner or angled portion (e.g., to serve as the vertex between two thicker portions of the material) to allow the layers to be shaped. The layers may be shaped (e.g., by folding, bending, thermoforming, molding, and the like) to produce a box-like structure, or a structure generally matching the shape of the area to be insulated.

It should be noted that the article may be formed by alternating molded layers and nonwoven layers. One or more nonwoven layers may be sandwiched between molded layers. Two nonwoven layers may sandwich a molded layer. The article may include a disproportionate amount of nonwoven layers to molded layers. For example, the article may have more molded layers than nonwoven layers, or vice versa. The article may include a plurality of surface layers (e.g., reflective layers) on the molded layers, the nonwoven layers, or both. The surface layers may be on an exterior surface of the article or may be on an interior layer surface (e.g., on a nonwoven layer sandwiched between molded layers).

The total thickness of the article may depend upon the number and thickness of the individual layers. It is contemplated that the total thickness may be about 10 mm or more, about 100 mm or more, or about 1,000 mm or more. The total thickness may be about 5,000 mm or less, about 3,000 mm or less, or about 2,000 mm or less. It is also contemplated that some of the individual layers may be thicker than other layers. For example, the thickness of the nonwoven layers may be greater than the thickness of the molded layers (individually or combined). The total thickness of the nonwoven layers may be greater than the total thickness of the molded layers. The thickness may vary between the same types of layers as well. For example, two nonwoven layers in the article may have different thicknesses. The article may be tuned to provide desired insulation characteristics and/or more general broad band sound absorption by adjusting the specific air flow resistance and/or the thickness of any or all of the layers.

Figure 1:
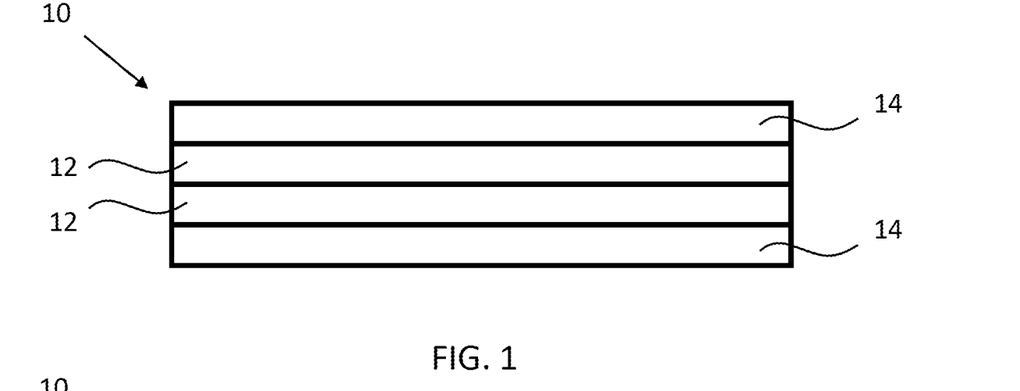
FIG. 1 is a cross-section of a multi-layered fibrous article.

Turning now to the figures, FIG. 1 illustrates a cross-section of an article 10. The article 10 includes a pair of abutting nonwoven layers 12 sandwiched between molded layers 14.

Figure 2:
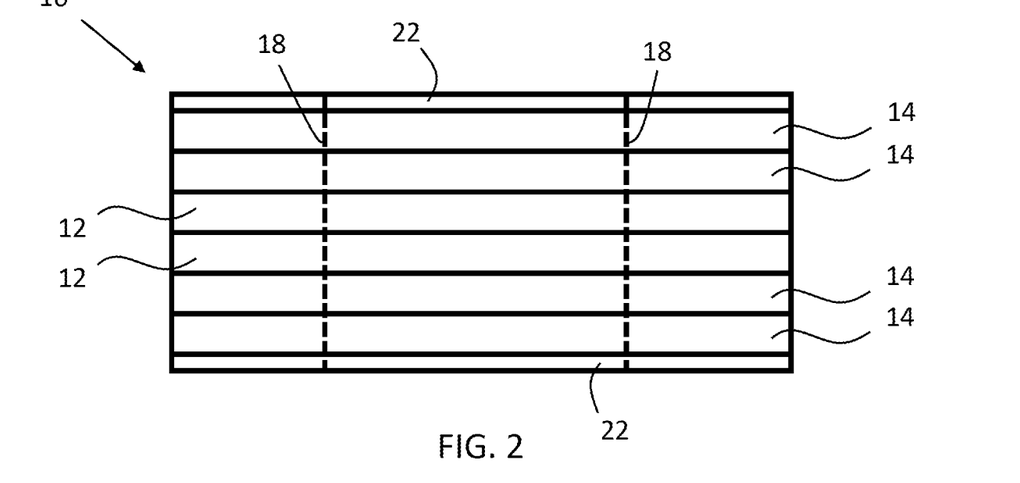
FIG. 2 is a cross-section of a multi-layered fibrous article.

FIG. 2 illustrates a cross-section of an article 10. The article 10 includes a pair of abutting nonwoven layers 12 sandwiched between a plurality of molded layers 14. Reflective layers 22 are disposed on opposing exterior surfaces of the article 10. As illustrated, stitching 18 created by sewing the nonwoven layers 12 and the molded layers 14 together secures the article 10 together.

Figure 3:
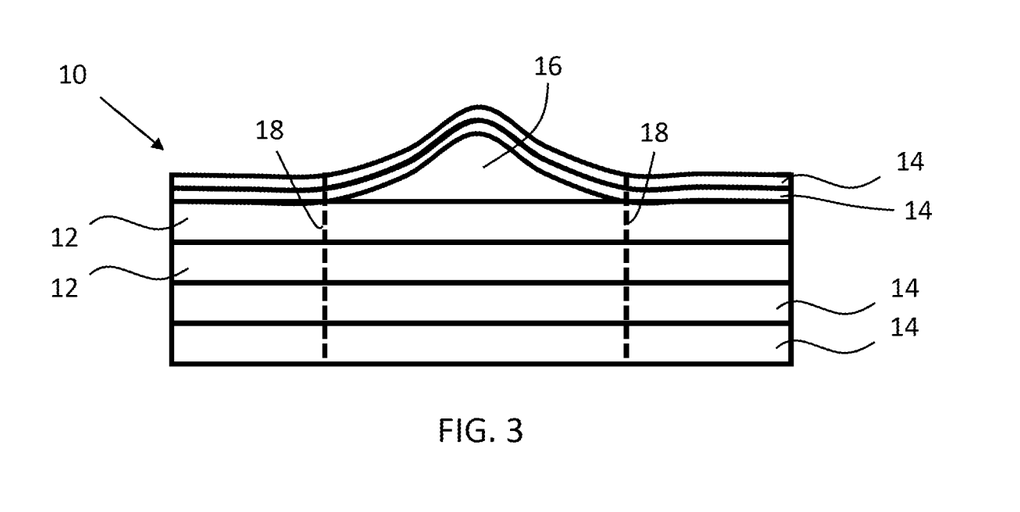
FIG. 3 is a cross-section of a multi-layered fibrous article.

FIG. 3 illustrates a cross-section of an article 10. The article 10 includes a pair of abutting nonwoven layers 12 sandwiched between a plurality of molded layers 14. Reflective layers 22 are disposed on opposing exterior surfaces of the article 10. As illustrated, stitching 18 created by sewing the nonwoven layers 12 and the molded layers 14 together secures the article 10 together. Furthermore, an air pocket 16 is formed between the molded layer 14 and the nonwoven layer 12 to improve air circulation throughout the article 10, heat absorption by the article 10, or both. It should be noted that while FIGS. 1-3 illustrate exemplary cross-sections of an article 10, the article 10 may include any desired number of nonwoven layers 12, molded layers 14, or both.

Figure 4:
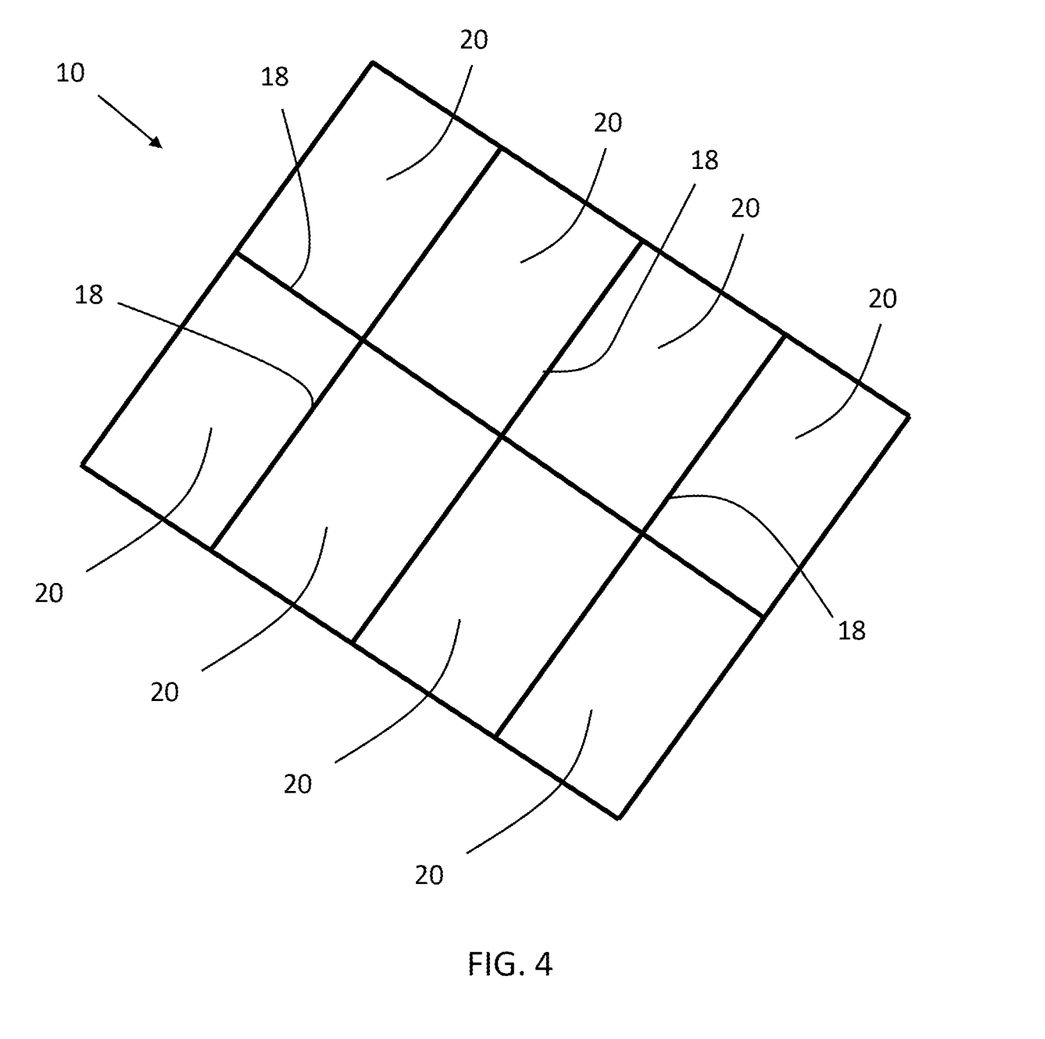
FIG. 4 is a top-down view of a fibrous article.

FIG. 4 illustrates a top-down view of an article 10. As illustrated, the article 10 may include a plurality of panels 20 formed by stitching 18 a plurality of layers of the article 10 together. It is contemplated that one or more of the panels 20 may include an air pocket formed by flexing one or more of the layers of the article 10 together to secure the layers to each other (see FIG. 3).

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+/−15.

ELEMENT LIST

10 Article
12 Nonwoven Layer
14 Molded Layer
16 Pocket
18 Stitching
20 Panel
22 Reflective Layer

What is claimed is:

1. An article comprising:
   (a) one or more nonwoven material layers comprising a lofted fibrous material;
   (b) one or more molded material layers having a fibrous matrix; and
   (c) one or more infrared (IR) reflective layers disposed on one or more exterior surfaces of the article;
   wherein at least one of the one or more molded material layers is a fiber cement layer, and wherein the article is configured to thermally insulate an item or compartment and the article absorbs external heat or cold to substantially prevent amplitude of temperature fluctuation of the item or within the compartment.

2. The article of claim 1, wherein the item to be insulated is a cabin of a vehicle.

3. The article of claim 2, wherein the external heat radiates from an engine bay.

4. The article of claim 1, wherein the article is temperature resistant and temperature absorbent at a temperature range of about −30° C. to about 350° C.

5. The article of claim 4, wherein the fibrous matrix includes fibers selected from polyester, polyacrylonitrile, oxidized polyacrylonitrile, aramid, olefin, polyamide, imide, polyetherketone, polyetheretherketone, poly(ethylene succinate), mineral, ceramic, natural, another inorganic fiber, or another polymeric fiber.

6. The article of claim 4, wherein the lofted fibrous material is selected from polyester, polyacrylonitrile, oxidized polyacrylonitrile, aramid, olefin, polyamide, imide, polyetherketone, polyetheretherketone, poly(ethylene succinate), mineral, ceramic, natural, another inorganic fiber, or another polymeric fiber.

7. The article of claim 1, wherein the one or more molded material layers are thermoformed.

8. The article of claim 1, wherein one or more air pockets are located between the one or more nonwoven material layers and the one or more molded material layers.

9. The article of claim 8, wherein the one or more nonwoven materials layers and the one or more molded materials layers are secured to one another via stitching to form the article.

10. The article of claim 9, wherein the article is flexible, formable, or both.

11. The article of claim 1, wherein the lofted fibrous material includes fibers that are generally vertically or near-vertically oriented.

12. The article of claim 1, wherein the fibrous matrix includes fibers that are generally vertically or near-vertically oriented.

13. The article of claim 11, wherein the lofted fibrous material and the fibrous matrix are made from generally the same fibers.

14. The article of claim 11, wherein the lofted fibrous material and the fibrous matrix are made from different fibers.

15. The article of claim 1, wherein the article includes at least two abutting nonwoven material layers sandwiched between at least two molded material layers.

16. The article of claim 1, wherein the one or more IR reflective layers are aluminum laminated glass cloth, aluminum foil, or both.

17. The article of claim 1, wherein the one or more nonwoven material layers and the one or more molded material layers each have a thickness of no greater than 50 mm.

18. The article of claim 17, wherein the fibers of the lofted fibrous material have a weight of about 400 to about 800 GSM.

19. The article of claim 1, wherein the one or more IR reflective layers are a coating applied to at least one of the one or more exterior surfaces of the article.

20. The article of claim 1, wherein the lofted fibrous material includes fibers that are carded and lapped into a three-dimensional structure.

* * * * *

UNITED STATES PATENT AND TRADEMARK OFFICE
CERTIFICATE OF CORRECTION

PATENT NO. : 11,794,445 B2
APPLICATION NO. : 17/777683
DATED : October 24, 2023
INVENTOR(S) : Manish Taxak and Sivansankaran Kumaraguru It is certified that error appears in the above-identified patent and that said Letters Patent is hereby corrected as shown below:

In the Claims

Column 13, Lines 5 and 6, Claim 9, delete "materials layers and the one or more molded materials layers are" and insert --material layers and the one or more molded material layers are--

Signed and Sealed this
Fifth Day of March, 2024

Katherine Kelly Vidal
*Director of the United States Patent and Trademark Office*